(12) United States Patent
Ehara et al.

(10) Patent No.: US 9,169,099 B2
(45) Date of Patent: Oct. 27, 2015

(54) LONG MEDIUM

(75) Inventors: Takayuki Ehara, Tokyo (JP); Jun Okazaki, Tokyo (JP); Hiroaki Suto, Tokyo (JP); Hirohisa Usami, Tokyo (JP); Hiroyuki Fukumoto, Tokyo (JP)

(73) Assignee: MAX Co., Ltd, Tokyo (JP)

( * ) Notice: Subject to any disclaimer, the term of this patent is extended or adjusted under 35 U.S.C. 154(b) by 184 days.

(21) Appl. No.: 13/700,105

(22) PCT Filed: Mar. 25, 2011

(86) PCT No.: PCT/JP2011/057483
§ 371 (c)(1),
(2), (4) Date: Apr. 2, 2013

(87) PCT Pub. No.: WO2012/131858
PCT Pub. Date: Oct. 4, 2012

(65) Prior Publication Data
US 2013/0202837 A1    Aug. 8, 2013

(30) Foreign Application Priority Data

Mar. 25, 2011 (JP) ................................. 2011-068994

(51) Int. Cl.
*B65H 26/06* (2006.01)
*B65H 20/20* (2006.01)
*B42D 5/02* (2006.01)
(Continued)

(52) U.S. Cl.
CPC ............... *B65H 26/066* (2013.01); *B41J 29/48* (2013.01); *B42D 5/023* (2013.01); *B42D 15/0073* (2013.01); *B65H 20/20* (2013.01); *B65H 26/063* (2013.01); *B41J 11/28* (2013.01); *B65H 2301/5151* (2013.01); *B65H 2511/114* (2013.01); *B65H 2511/512* (2013.01); *B65H 2553/412* (2013.01);
(Continued)

(58) Field of Classification Search
CPC ............. B65H 20/20; B65H 2511/114; B65H 2511/512; B65H 2511/514; B65H 2701/377; B65H 2701/1211; B65H 2301/5151; B65H 26/06; B65H 26/066; B65H 26/063; B65H 2801/03; B65H 2220/03; B42D 5/023; B42D 5/02; B42D 15/0073; B41J 11/28
USPC ................................................ 428/40.1, 41.8
See application file for complete search history.

(56) References Cited

U.S. PATENT DOCUMENTS 4,708,901 A * 11/1987 Wood .............................. 428/131
4,768,410 A *  9/1988 Wood .................................. 83/63
(Continued)

FOREIGN PATENT DOCUMENTS

DE     3631937 A1    4/1987
DE    19739251 A1    3/1998
(Continued)

*Primary Examiner* — Patricia L Nordmeyer
(74) *Attorney, Agent, or Firm* — Haverstock & Owens LLP

(57) ABSTRACT

A plurality of marks (11) equidistantly provided on both side edge parts (1a) of a long medium (1), a plurality of first indicator holes (12) equidistantly given on at least one of the side edge parts (1a), and a plurality of second indicator holes (13) given on at least one of the side edge parts (1a) on a straight line different from a row of the first indicator holes (12) at spacings shorter than spacings of the first indicator holes (12) are provided, and the second indicator holes (13) are each provided to a side of a trailing-end mark (11b), and each gradually comes closer to a leading-end mark (11a) as the long medium (1) runs toward a trailing end.

5 Claims, 16 Drawing Sheets

(51) Int. Cl.
  *B42D 15/00* (2006.01)
  *B41J 29/48* (2006.01)
  *B41J 11/28* (2006.01)

(52) U.S. Cl.
  CPC .. *B65H 2701/1211* (2013.01); *B65H 2701/377* (2013.01); *B65H 2801/03* (2013.01); *Y10T 428/1476* (2015.01)

(56) References Cited

U.S. PATENT DOCUMENTS

| | | | | |
|---|---|---|---|---|
| 4,834,276 A | * | 5/1989 | Logan | 226/76 |
| 4,867,363 A | * | 9/1989 | Wood et al. | 226/76 |
| 4,895,287 A | * | 1/1990 | Wood et al. | 226/76 |
| 6,106,645 A | * | 8/2000 | Stempien | 156/64 |

FOREIGN PATENT DOCUMENTS

| | | |
|---|---|---|
| EP | 0226414 A2 | 6/1987 |
| EP | 0857680 A1 | 8/1998 |
| GB | 2127374 A | 4/1984 |
| GB | 2184062 A | 6/1987 |
| JP | 62-093162 A | 4/1987 |
| JP | 10-231059 A | 9/1998 |
| JP | 2000-247003 A | 9/2000 |
| JP | 2000-289906 A | 10/2000 |
| JP | 2001-063254 A | 3/2001 |

* cited by examiner

ND MEDIUM

FIELD OF THE INVENTION

This invention relates to a long medium provided with marks near a side edge portion in a longitudinal direction for use in a printer, a plotter, or the like (hereinafter simply referred to as a printer or the like) and, in more detail, a long medium wound, for example, in a roll shape, with which the remaining amount can be mechanically detected and also visually recognized. The present application asserts priority rights based on JP Patent Application 2011-068994 filed in Japan on Mar. 25, 2011. The total contents of disclosure of the Patent Application of the senior filing date are to be incorporated by reference into the present Application.

BACKGROUND OF THE INVENTION

A long medium having an adhesive sheet temporarily adhered to a release sheet is provided with a plurality of holes in which a sprocket, a tractor, or the like is engaged on a side edge part in a longitudinal direction, and runs with the sprocket or tractor being engaged in these holes to rotate. The long medium that is caused to run by using the sprocket or tractor does not diagonally run at the time of print output, compared with a scheme in which the long medium is interposed between rollers to be conveyed with a force of friction with the rollers, and thus the long medium can be caused to linearly run in a stable manner. Therefore, in a printer for outputting a long medium of several meters, for example, a long medium that is caused to run by using a sprocket or tractor without positional misalignment is used.

This long medium is used as a print medium on which figures and characters are to be printed indoors, outdoors, on a nameplate, or the like. For example, in a printer using a thermal head as a head, a dye on an ink ribbon is transferred onto a print layer to form a predetermined image. Then, after printing, the long medium is cut out by a printer-incorporated or separate cutting device into a predetermined shape, the release sheet is peeled off, and is then affixed to a predetermined place.

The long medium of this type has a roll shape, is set at a printer or the like, and is caused to run by a sprocket or tractor. When printing with a length of several meters is performed, if the long medium runs out in the course of printing, the long medium printed so far goes to waste. To prevent this, in the printer or the like, the set roll-shaped long medium is removed, and the roll diameter is visually checked. However, in visual checking, the remaining amount is visually estimated, and it is therefore difficult to correctly grasp the remaining amount.

Moreover, when the set roll-shaped long medium is removed and the remaining amount is visually checked, if the remaining amount is sufficient, the roll-shaped long medium is required to be set again. On the other hand, if the remaining amount is insufficient, a new roll-shaped long medium is required to be set at the printer or the like. The work of resetting the long medium requires a work of rewinding the long medium drawn from the printer or the like into a roll, and this work is cumbersome.

Meanwhile, a long medium is desired that allows the remaining amount of the long medium set at a printer or the like to be visually checked at ease.

For example, in Patent Document 1 discloses that indicators indicating the remaining amount are given to a long web. In Patent Document 1, specifically, first indicators are equidistantly given, second indicators are given at second spacings different from spacing of the first indicators, and each spacing between adjacent ones of the first indicators and a relevant one of the second indicators is changed along the length of the medium. However, when the length of the medium is desired to be visually checked before the medium is set at the printer or the like, while the length is indicated by the spacing between the adjacent ones of the first indicators and the relevant second indicator, it is not possible to grasp a visually-specific remaining length. For example, when an output of three meters is desired to be obtained, it is difficult to visually determine whether a medium has three meters or longer left by using the first indicators and the second indicators shown on the medium to be set at a printer or the like.

Moreover, Patent Document 2 also discloses that indicators indicating the remaining amount are given to a long web. Specifically, this Patent Document 2, discloses that multi-stage marks are provided on a long sheet and the remaining amount is shown with a pattern formed of combinations of the marks. When the remaining amount is shown with a pattern formed of combinations of the marks, a method of giving a pattern formed of combinations of black and white, that is, formed of a binary number, can achieve the highest resolution power.

However, when the remaining amount is displayed with a pattern of black and white, if the remaining amount is tried to be visually grasped only with the sheet the binary pattern is required to be decoded, and it is difficult for general users to grasp the remaining amount.

PRIOR-ART DOCUMENTS

Patent Documents

PTL 1: Japanese Patent No. 3756308
PTL 2: Japanese Patent Application Laid-Open No. 4-235853

SUMMARY OF THE INVENTION

The present invention was made in view of the problems as described above, and has an object of providing a long medium capable of visually grasping the remaining amount of the long medium at ease and in a correct manner.

Also, another object of the present invention is to provide a long medium allowing mark indicators to be achieved at low cost without narrowing a print area even if the mark indicators are provided.

Furthermore, still another object of the present invention is to provide a long medium allowing the remaining amount of the long medium to be easily detected.

To solve the problems described above, a long medium according to the present invention is a long medium having an adhesive sheet temporarily adhered to a release sheet, and includes a plurality of holes equidistantly provided on a straight line on both side edge parts in a longitudinal direction, a plurality of first indicators repeatedly given on at least one of the side edge parts on a straight line at spacings of an integral multiple of spacings of the plurality of holes, and a plurality of second indicators repeatedly given on at least one of the side edge parts on a straight line different from a row of the first indicators at spacings shorter than spacings of the first indicators, wherein the plurality of holes, the plurality of first indicators, and the plurality of second indicators are provided approximately in parallel to one another, a spacing between a leading-end hole and a trailing-end hole among the plurality of holes sectioned by adjacent ones of the first indicators near inside the adjacent ones of the first indicators indicates a reference length of the long medium, a first ratio of a spacing between the plurality of the holes and a unit length of the long medium and a second ratio of a difference between a spacing between the first indicators and a spacing between the second indicators and a change amount of a length of the long medium indicated by this difference are approximately equal to each other, the second indicators are provided to a side of the trailing-end hole, and each gradually come closer to the leading-end hole that pairs up with the trailing-end holes as the long medium runs toward a trailing end, and a spacing between the leading-end hole and the second indictor is approximately proportional to a remaining amount of the long medium. According to the long medium of the present invention, since the spacing between the holes on the side edge art of the long medium is provided as a mark indicator each indicating a unit length of the long medium, the remaining amount of the long medium can be visually grasped at ease by comparing this hole and a distance from the first indicator to the second indicator. Furthermore, according to the long medium of the present invention, the first indicators and the second indicators are mechanically detected by detecting means such as an optical sensor to calculate each distance from the first indicator to the second indicator, the remaining amount of the long medium can also be mechanically detected at ease.

The spacing between the first indicators and the spacing between the second indicators may be set so as to have a relation in which the long medium runs out when the second indicator reaches a position of the leading-end hole.

The first indicators and the second indicators may have a translucency higher than that of any other area of the long medium.

DETAILED DESCRIPTION OF THE INVENTION

Figure 1:
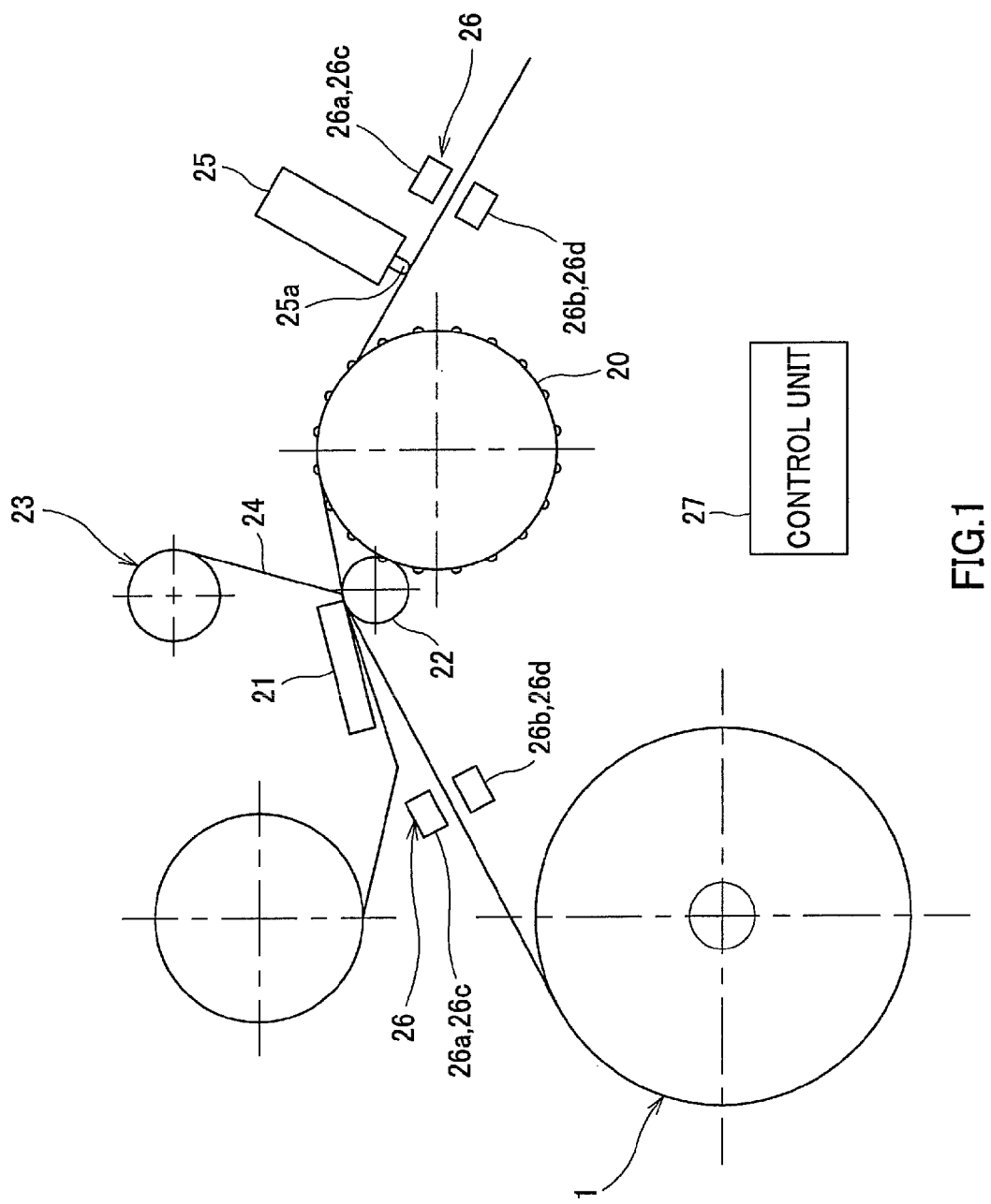
FIG. 1 is a block diagram of the structure of a printer in which a long medium to which the present invention is applied is used.

The long medium to which the present invention is applied is described in detail below with reference to the drawings. Note that the description is made in the following order.
1. General outline of the long medium
2. Description of the printer
3. Description of the operation of the remaining amount detecting process by the printer
4. Description of the operation of the conveyance error detecting process by the printer
5. Modification examples
6. First reference example
7. Second reference example 1. General Outline of the Long Medium As depicted in FIG. 1, a long medium 1 to which the present invention is applied is, for example, used at a printer 2 in which a thermal head is used as a printer head. In this printer 2, for example, figures and characters are to be printed indoors, outdoors, on a nameplate, or the like, and an image having a length of several meters is printed in the case of a long image.

Figure 2:
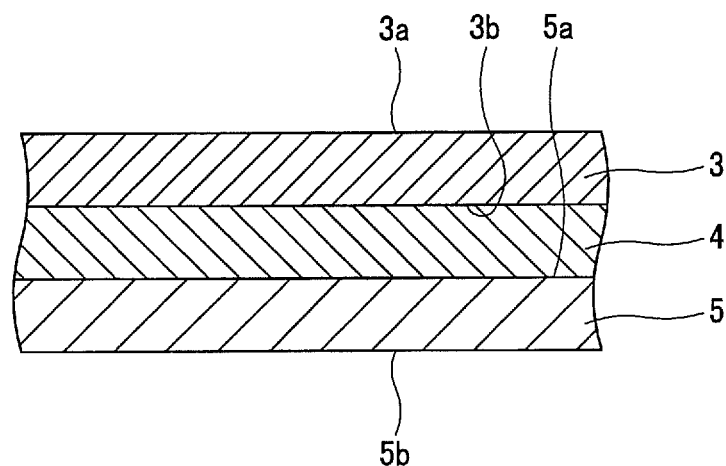
FIG. 2 is a longitudinal sectional view of the long medium to which the present invention is applied.

Also, in this long medium 1, as depicted in FIG. 2, an adhesive sheet 3 having a front surface 3a as a print layer and a back surface 3b with an adhesive layer 4 formed thereon is temporarily adhered to a front surface 5a of a release sheet 5 via an adhesion layer 4. This adhesive sheet 3 is provided so as to be narrower than the release sheet 5. Therefore, both of side edge parts 1a of the long medium 1 in a longitudinal direction are non-print areas where the adhesive sheet 3 as a print layer is not provided. Furthermore, on an entire back surface 5b side of the release sheet 5, a design such as a grid, a logo indicating a product name, or the like has already been printed. Note that a logo or the like may not be printed on the back surface 5b side of the release sheet 5.

Figure 3:
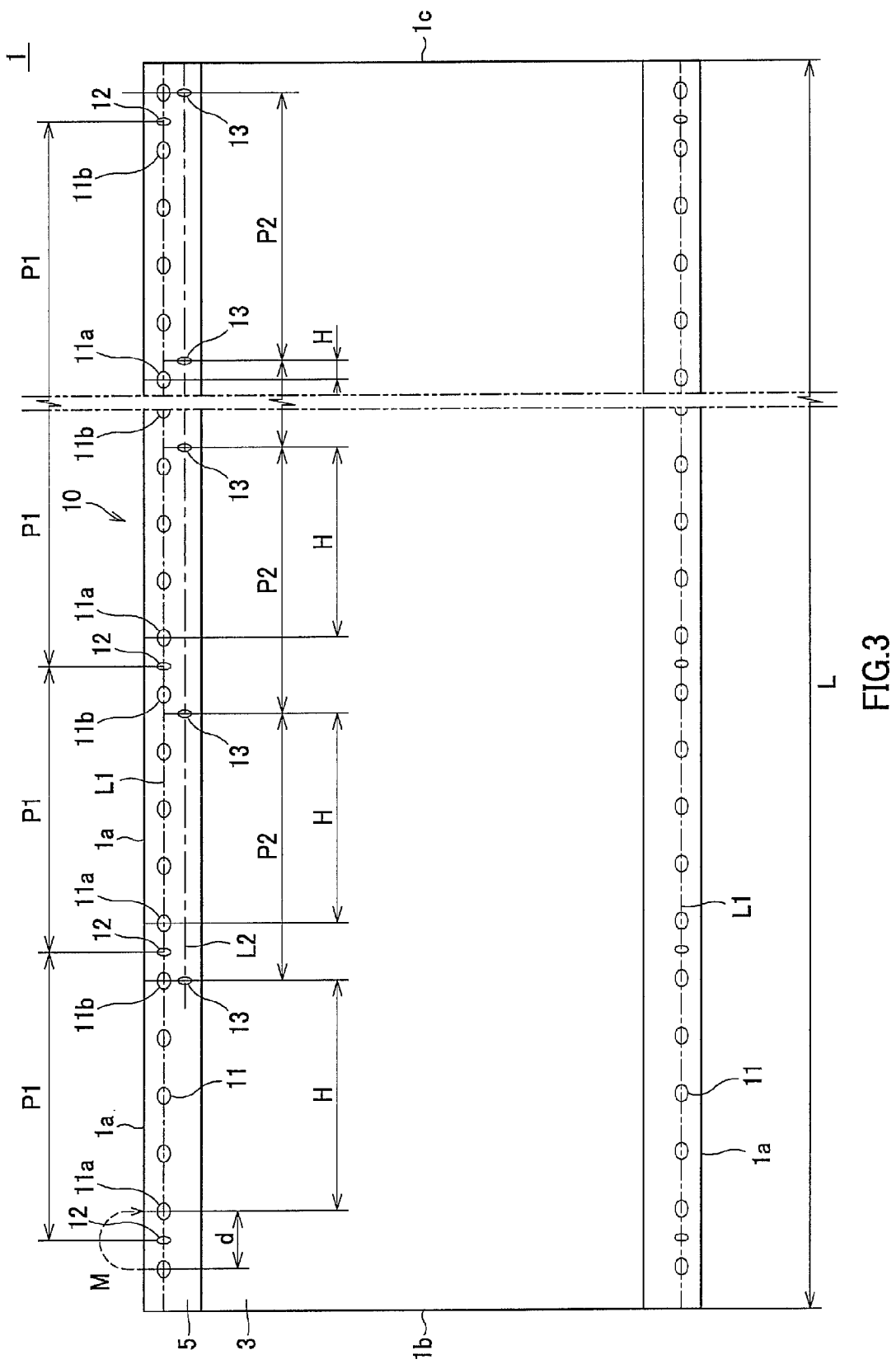
FIG. 3 is a plan view of the long medium to which the present invention is applied.

As depicted in FIG. 3, the long medium 1 is given a mark part 10 allowing the remaining amount of the long medium 1 to be visually and mechanically grasped. This mark part 10 has mark holes 11 serving as mark indicators, first indicator holes 12 serving as first indicators indicating a reference position when the remaining amount of the long medium 1 is displayed, and second indicator holes 13 serving as second indicators each to which a distance from a relevant first indicator indicates the current remaining amount of the long medium 1.

Specifically, the mark holes 11 are equidistantly provided toward the longitudinal direction on both of the side edge parts 1a of the long medium 1 in the longitudinal direction, that is, on both of side edge parts of the release sheet 5 where the adhesive sheet 3 is not provided (on the non-print areas). The first indicator holes 12 are repeatedly and equidistantly given toward the longitudinal direction on one of the side edge parts 1a in the longitudinal direction. The second indicator holes 13 are repeatedly and equidistantly given on one of the side edge parts 1a in the longitudinal direction that is the same side as that of the first indicator holes 12.

These mark holes 11, first indicator holes 12, and second indicator holes 13 are provided so as to be approximately parallel to each other. The mark holes 11 are provided on a straight line L1 toward the longitudinal direction. The first indicator holes 12 are provided between the mark holes 11, 11 on the same straight line L1 as that of the mark holes 11. Note that, as will be described farther below, the first indicator holes 12 may be provided on a straight line different from that of the mark holes 11. The second indicator holes 13 are provided on a straight line L2 different from a row of the first indicator holes 12, for example, inside the row of the first indicator holes 12 in a width direction.

Furthermore, the mark holes 11, the first indicator holes 12, and the second indicator holes 13 are through holes penetrating through the long medium 1. For example, the mark holes 11 are each formed in a circular shape, and the first indicator holes 12 and the second indicator holes 13 are each formed in a long hole shape. Still further, the mark holes 11 are, for example, sprocket holes, in which projections 20a of a sprocket 20 of the printer 2, which will be described further below, are engaged. With the projections 20a of the sprocket 20 engaged in the mark holes 11, when the sprocket 20 is driven and rotated, the long medium 1 is conveyed in the longitudinal direction.

Still further, the first indicator holes 12 and the second indicator holes 13 each have a hole diameter provided so as to be smaller than that of each mark hole 11. Therefore, having shapes and sizes different from those of the mark holes 11, the first indicator holes 12 and the second indicator holes 13 can be easily discriminated from the first holes 11.

Still further, the first indicator holes 12 are repeatedly given over an overall length L of the long medium 1 from a tip 1b to a trailing end 1c with a spacing 11, which is an integral multiple nd (n is an integer) of a spacing d between the plurality of mark holes 11. The second indicator holes 13 are repeatedly given from a position shifted by a predetermined distance from the tip 1b of the long medium 1 in the longitudinal direction to a trailing end 1c side with a spacing P2 shorter than that of the first indicator holes 12.

Note that the first indicators 12 are indicators for equidistantly sectioning the mark holes 11 and the first indicators 12 are not necessarily required to be equidistantly, successively, and repeatedly given with the spacing. Spacings of two or more types may be alternately and repeatedly given.

The first indicators 12 can be provided at any positions as long as they can be grasped as being on the same straight line as that of the mark holes 11, and the second indicators 13 can be provided at any positions as long as they can be grasped as being on a straight line different from that of the mark holes 11. For example, a shape may be placed such that part of the indicators projects on two different straight lines of the mark hole 11 and the second indicators 13.

Furthermore, the plurality of mark holes 11 each interposed between adjacent first indicator holes 12, 12 to be sectioned are mark holes as a reference when the remaining amount of the long medium 1 is grasped, and the spacing d of adjacent mark holes 11 indicates a unit length M of the long medium 1. Here, a mark hole 11 near the inside of the first indicator hole 12 at a tip 1b side of the long medium 1 serves as a leading-end mark hole 11a, and a mark hole 11 near the inside of the first indicator hole 12 at a trailing end 1c side serves as a trailing-end mark hole 11b that pairs up with the leading-end mark hole 11a. A distance between the paired leading-end mark hole 11a and trailing-end mark hole 11b indicates a reference length of the long medium 1, serving as a mark indicator. By contrast, the first indicator holes 12 each indicate a boundary of mark indicators in a predetermined section.

Still further, the plurality of the mark holes 11, the plurality of first indicator holes 12, and the plurality of second indicator holes 13 are provided so that a first ratio between the spacing d between the plurality of mark holes 11 and the unit length M of the long medium 1 and the second ratio between a difference between the spacing P1 between the first indicator holes 12 and the spacing P2 between the second indicators 13 and a change amount of the length of the long medium 1 indicated by this difference are approximately equal to each other.

That is, a second indicator hole 13 that comes first and is closest to the tip 1b side of the long medium 1 indicates that the long medium 1 is in a not-used state, and is therefore given so as to match a trailing-end mark hole 11b that comes first and is given closest to the tip 1b of the long medium 1. Then, a second indicator hole 13 that comes second and thereafter are given so that the second indicator hole 13 gradually comes closer to the leading-end mark hole 11a by a predetermined length along the length of the long medium as the long medium 1 runs toward the trailing end 1c. In other words, the second indicator hole 13 that comes second is provided so that a spacing H between the leading-end mark hole 11a and the second indicator hole 13 is gradually narrower by a predetermined length along the length of the long medium 1 as the long medium 1 runs toward the trailing end 1c.

Next, the spacing P1 between the first indicator holes 12 and the spacing P2 between the second indicator holes 13 are described by using specific values.

Here, as depicted in FIG. 4 to FIG. 7, for example, the case is described in which the overall length L of the long medium 1 is set as 15 m (15000 mm), the spacing d between the mark holes 11 is set as 10 mm, and the unit length M of the long medium 1 indicated by this spacing d between the mark holes 11 is set as 1 m (1000 mm). In this case, a first ratio S between the spacing d between the mark holes 11 and the unit length M of the long medium 1 is S=d/M=10/1000=1/100. That is, the mark indicators formed of the plurality of mark holes 11 are displayed with a 1/100 scale of the length of the long medium 1.

Furthermore, as the spacing P1 between the first indicator holes 12, P1≥L×S=15000×1/100=150 mm or longer is required to ensure mark indicators for the overall length L of the long medium 1. Therefore, since the spacing P1 between the first indicator holes 12 is provided as a spacing of an integer multiple nd of the spacing d between mark holes 11 as described above, from P1≥n×d, n>15 is required to be satisfied.

Here, each spacing between display sections is taken as a 1/d pitch, and n=16. With this, the spacing P1 between the first indicator holes 12 is P1=160 mm from P1=n×d. That is, the first indicator holes 12 are given with the pitch of 160 mm so that sixteen mark holes 11 are interposed each between adjacent first indicator holes 12, 12.

And, as described above, since the first indicator holes 12 are given with the pitch of 160 mm, the length of the long medium 1 is shorter by 160 mm from the tip 1b toward the trailing end 1c of the long medium 1. Therefore, from the tip 1b to the trailing end 1c of the long medium 1, the second indicator holes 13 are given so as to each come closer by an amount obtained by multiplying 160 mm by the first ratio S described above, that is, 1/100, to the leading-end mark hole 11a rather than the adjacent second indicator hole 13 on the tip 1b side. That is, the spacing P2 between the second indicator holes 13 is P2=P1(1−S). Thus, the spacing P2 between the second indicator holes 13 is P2=160×(1−(1/100))=158.4 mm.

Figure 4:
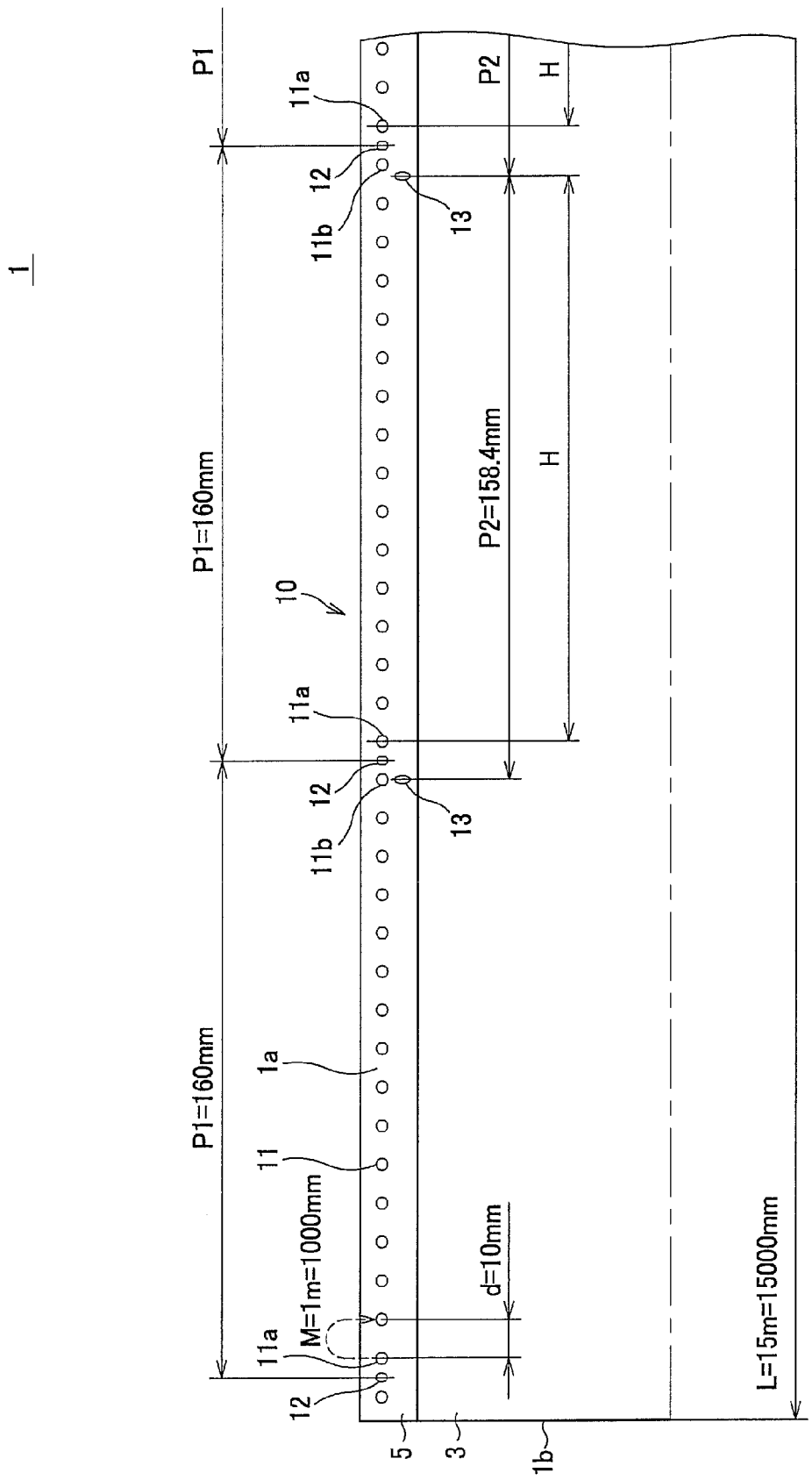
FIG. 4 is a plan view of part of the long medium to which the present invention is applied.

Therefore, as depicted in FIG. 4, at the tip 1b of the long medium 1, the second indicator hole 13 is placed so as to match the trailing-end mark hole 11b that comes first and is given closest to the tip 1b of the long medium 1. The trailing-end mark hole 11b matching this second indicator hole 13 is a mark hole 11 that comes fifteenth from the leading-end mark hole 11a that pairs with the trailing-end mark hole 11b on the trailing end 1c side. Therefore, it is possible to visually grasp that the long medium 1 has the remaining amount of approximately 15 m.

Figure 5:
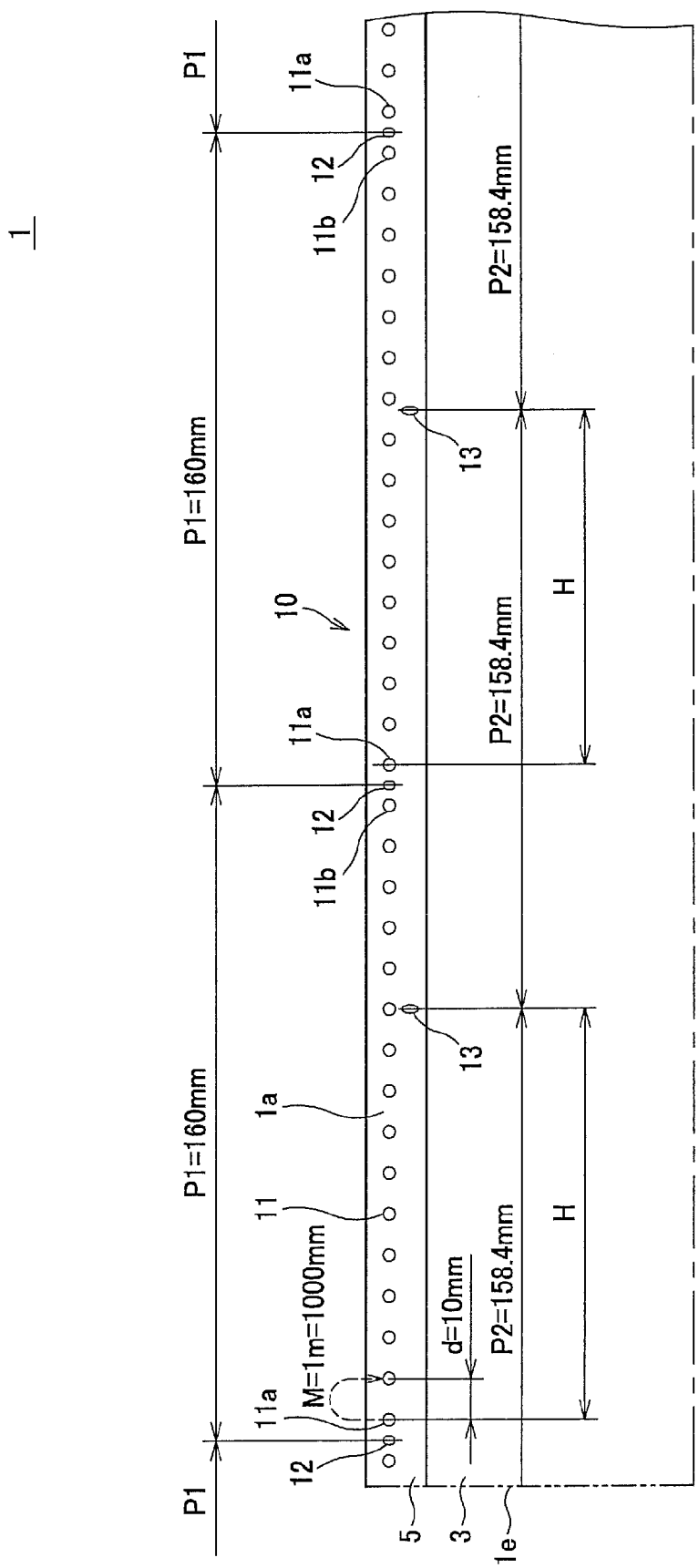
FIG. 5 is a plan view of part of the long medium to which the present invention is applied.
Figure 6:
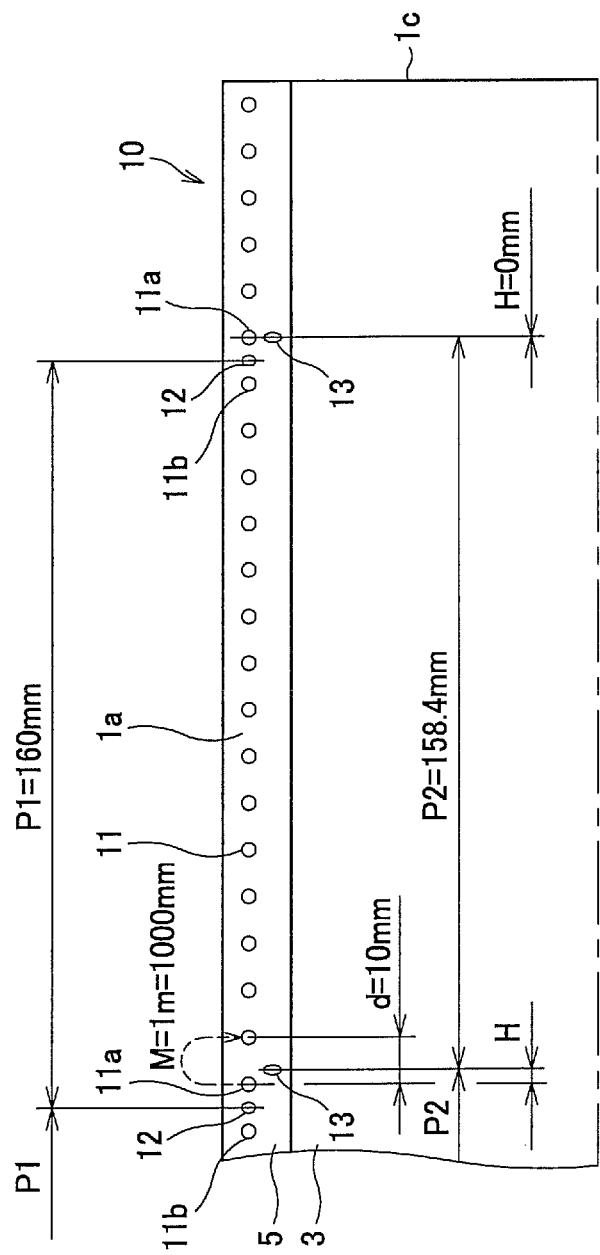
FIG. 6 is a plan view of part of the long medium to which the present invention is applied.
Figure 7:
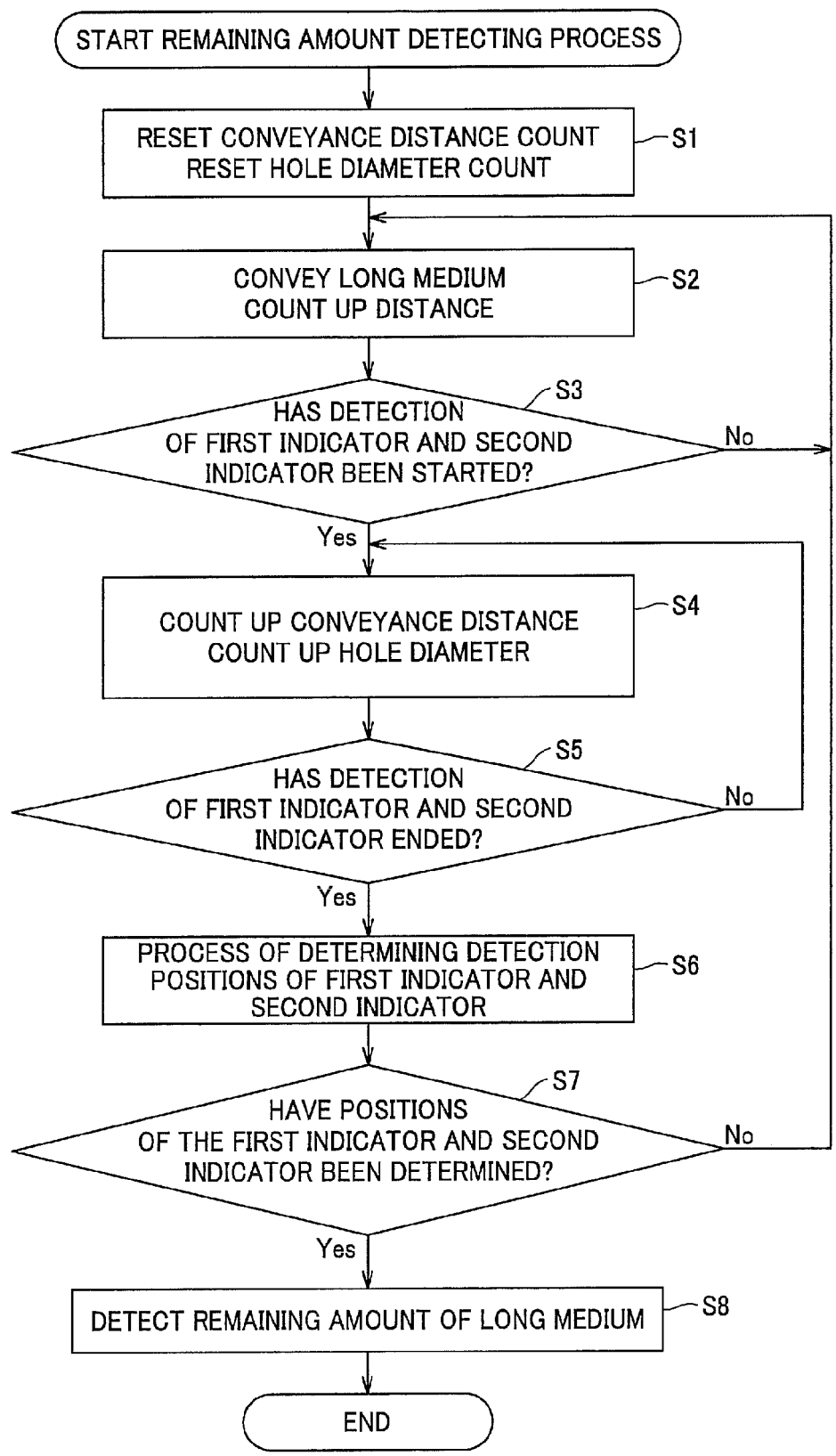
FIG. 7 is a flowchart when a process of detecting the remaining amount the long medium to which the present invention is applied.

Furthermore, as depicted in FIG. 5, at a position approximately 5 in from the tip 1b of the long medium 1, the second indicator hole 13 is placed so as to approximately match a mark hole 11 that comes tenth from the leading-end mark hole 11a on the trailing end 1c side. With this, it is possible to visually grasp that the long medium 1 has the remaining amount of approximately 10 m. Still further, as depicted in FIG. 6, at a position approximately 15 m from the tip 1b of the long medium 1, the second indicator hole 13 is placed so as to approximately match the leading-end mark hole 11a. With this, it is possible to visually grasp that the long medium 1 has no remaining amount.

Therefore, since the long medium 1 to which the present invention is applied is provided with the spacing d between the mark holes 11 on the side edge part 1a as mark indicators each indicating the unit length M of the long medium 1, the remaining amount of the long medium 1 can be visually grasped at ease and in a correct manner by comparing the mark holes 11 and the distance from the leading-end mark hole 11a to the second indicator hole 13.

Furthermore, in the long medium 1 to which the present invention is applied, with the holes 11, which are sprocket holes provided conventionally for conveyance, being taken as mark indicators, no separate mark indicators are not required to be provided, and mark indicators can be provided at low cost, thereby inhibiting an increase in cost of the long medium 1. Still further, in the long medium 1 to which the present invention is applied, the print area is not narrowed even mark indicators are provided, and the print area can be widely provided. Still further, in the long medium 1, indicators are not required to be forcibly provided on the front surface 5a of the release sheet 5 where ink is less prone to be fixed ink is less prone to be fixed on the back surface 5b of the release sheet 5 where print has already been present.

2. Description of the Printer

The long medium 1 as described above is mounted on the printer 2 as being wound like a roll paper sheet as depicted in FIG. 1. Specifically, in the printer 2, the roll of the long medium 1 is rotatably accommodated in an accommodating unit (not shown) inside a device main body. The long medium 1 drawn from the roll is caused to run with the sprocket 20 being engaged in the mark holes 11 on both of the side edge parts 1a and being guided by a plurality of guide pins (not shown) and guide rollers (not shown). Furthermore, in the printer 2, a thermal head 21 for applying heat energy according to print data is placed so as to face a platen 22 on an upstream side of the sprocket 20 in a running direction of the long medium 1. Still further, in the printer 2, an ink ribbon cartridge 23 is inserted, and an ink ribbon 24 is interposed between the thermal head 21 and the platen 22. The ink ribbon 24 is superposed between the thermal head 21 and the platen 22, and the ink ribbon 24 is brought into contact with the print layer of the long medium 1 in a pressed manner. In the long medium 1, with heat energy being applied by the thermal head 21 according to the print data, a dye of the ink ribbon 24 is transferred to the print layer of the long medium 1, thereby forming an image.

Furthermore, a cutting mechanism 25 for cutting the printed long medium 1 is provided on a downstream side of the sprocket 20. The cutting mechanism 25 includes a cutter 25a moving in a width direction of the long medium 1. With the cutter 25a moving in the width direction of the long medium 1 and the long medium 1 running, the long medium 1 is cut out into a predetermined shape.

Also, a remaining amount detection sensor 26 is provided on an upstream side of the thermal head 21 or on a downstream side of the cutting mechanism 25. The remaining amount detection sensor 26 has a first light-emitting unit 26a detecting the first indicator holes 12 and a first light-receiving unit 26b detecting light emitted from the first light-emitting unit 26a placed so as to face each other, and has a second light-emitting unit 26c detecting the second indicator holes 13 and a second light-receiving unit 26d detecting light emitted from the second light-emitting unit 26c placed so as to face each other.

The printer 2 uses a control unit 27 such as a microcomputer to control a motor driving the sprocket 20, the remaining amount detection sensor 26, the cutting mechanism 25, the thermal head 21, and others. For example, the control unit 27 calculates the remaining amount of the long medium 1 based on a phase difference between outputs from the first and second light-receiving units 26b and 26d of the remaining amount detection sensor 26. Furthermore, the control unit 27 causes a user to be notified through a display unit or a loudspeaker of a shortage of the long medium 1 when the remaining amount of the long medium 1 is shorter than the length of the print area according to print data.

Note that the printer 2 is not restricted to include the thermal head 21, and can be any as long as printing is made on the long medium 1. For example, the printer 2 may be a printer including a head of an ink jet type in which ink is pressed by pressure generated from a heater or a piezo element and the pressed ink is discharged from a discharge port as droplets to the long medium 1 to print an image or character on the long medium 1. Also, the ink ribbon may be of a single color, or dyes of yellow, cyan, magenta, black, and others may be panel-sequentially provided on one ribbon.

3. Description of the Operation of the Remaining Amount Detecting Process By the Printer Next, the operation of a remaining amount detecting process by the above-configured printer 2 is described with reference to a flowchart of FIG. 7. Here, for example, as depicted in FIG. 5, the case is described in which the remaining amount of the long medium 1 having a predetermined length from the tip 1b already used is detected. Note that a two-dot chain line in FIG. 5 indicates a midcourse tip 1e.

At step S1, when the long medium 1 is mounted on the printer 2 or at power-on or the like with the long medium 1 being mounted on the printer 2, the control unit 27 performs an initializing process. Specifically, the control unit 27 resets a count of a conveyance distance of the long medium 1 to be counted up according to the rotation amount of the motor driving the sprocket 20. Furthermore, the control unit 27 resets a count of hole diameters of the first indicator holes 12 and the second indicator holes 13.

At step S2, the control unit 27 causes the long medium 1 to be conveyed. Specifically, the control unit 27 causes the long medium 1 drawn from the roll to run by causing the motor to drive the sprocket 20 engaged in the mark holes 11 on both of the side edge parts 1a and causing the plurality of guide pins and guide rollers to guide. Furthermore, the control unit 27 counts up a conveyance distance of the long medium 1.

At step S3, the control unit 27 causes the remaining amount detection sensor 26 to start a process of detecting the first indicator holes 12 and the second indicator holes 13 of the long medium 1 being conveyed.

At step S4, the control unit 27 causes the first light-emitting unit 26a and the first light-receiving unit 26b to detect a first indicator hole 12 closest to the midcourse tip 1e. Here, the control unit 27 causes a conveyance distance and a hole diameter of the first indicator hole 12 to be detected. Note that the hole diameter mentioned herein is a diameter when the first indicator holes 12 and the second indicator holes 13 each have a circular shape and is a length in the longitudinal direction when they each have a long hole shape. Then, this hole diameter is calculated based on the phase of outputs from the first and second light-receiving units 26b and 26d.

Furthermore, after the first indicator hole 12 closest to the midcourse tip 1e is detected, the control unit 27 causes the second light-emitting unit 26c and the second light-receiving unit 26d to detect a second indicator hole 13 on the trailing end 1c side from the detected first indicator hole 12. Here, the control unit 27 causes a conveyance distance and a hole diameter of the second indicator hole 13 to be detected. Then, at step S5, the control unit 27 ends detection of the first indicator hole 12 and the second indicator hole 13. Note that when the first indicator hole 12 and the second indicator hole 13 cannot be detected for a predetermined time and with conveyance by a predetermined distance, the control unit 27 may stop the operation and cause the user to be notified via the display unit or the loudspeaker that an authorized long medium 1 should be used.

At step S6, the control unit 27 calculates positions of the detected first indicator hole 12 and second indicator hole 13. Specifically, the control unit 27 subtracts a half length of the hole diameter of the first indicator hole 12 from the detected conveyance distance of the first indicator hole 12 to calculate a conveyance distance at a center position of the first indicator hole 12. Furthermore, the control unit 27 subtracts a half length of the hole diameter of the second indicator hole 13 from the detected conveyance distance of the second indicator hole 13 to calculate a conveyance distance at a center position of the second indicator hole 13. Then, at step S7, the control unit 27 ends the process of calculating the conveyance distances at the center positions of the first indicator hole 12 and the second indicator hole 13.

At step S8, the control unit 27 subtracts the conveyance distance at the center position of a first indicator hole 12 that comes first from the midcourse tip 1e from the conveyance distance at the center position of a second indicator hole 13 that comes first to calculate a first spacing between the first indicator hole 12 that comes first and the second indicator hole 13 that comes first.

Then, the control unit 27 detects the remaining amount of the long medium 1 from the first spacing H. Specifically, the mark indicators and the length of the long medium 1 have a relation of the first ratio S. For example, the mark indicators are displayed with a 1/100 scale of the length of the long medium 1. Therefore, the remaining amount of the long medium 1 can be calculated with the first spacing H and the first ratio S. For example, the remaining amount of the long medium 1 can be calculated by multiplying the first spacing H by 100. As such, the printer 2 detects the remaining amount of the long medium 1.

Note that, thereafter, the control unit 27 compares the detected remaining amount of the long medium 1 and the length of the print area according to input print data. Then, when the detected remaining amount is shorter than the length of the print area, the control unit 27 stops the operation, and notifies the user via the display unit or the loudspeaker that the remaining amount is insufficient. Also, when the detected remaining amount is longer than the print area, the control unit 27 causes the long medium 1 to be rewounded and then conveyed again to cause printing according to the print data by using the ink ribbon 24, the thermal head 21, and the platen 22, and then causes the cutter 25a to cut out according to cut-out data. Furthermore, even at the time of printing, the operations from step S3 to step S8 are performed to always detect the remaining amount of the long medium 1.

That is, in the long medium 1 to which the present invention is applied, since the first indicator holes 12 and the second indicator holes 13 are through holes, by only providing an optical sensor capable of detecting a through hole to the printer 2, the first indicator hole 12 and the second indicator hole 13 can be easily detected. Therefore, in the long medium 1 to which the present invention is applied, the remaining amount of the long medium 1 can also be mechanically detected at ease.

Figure 8:
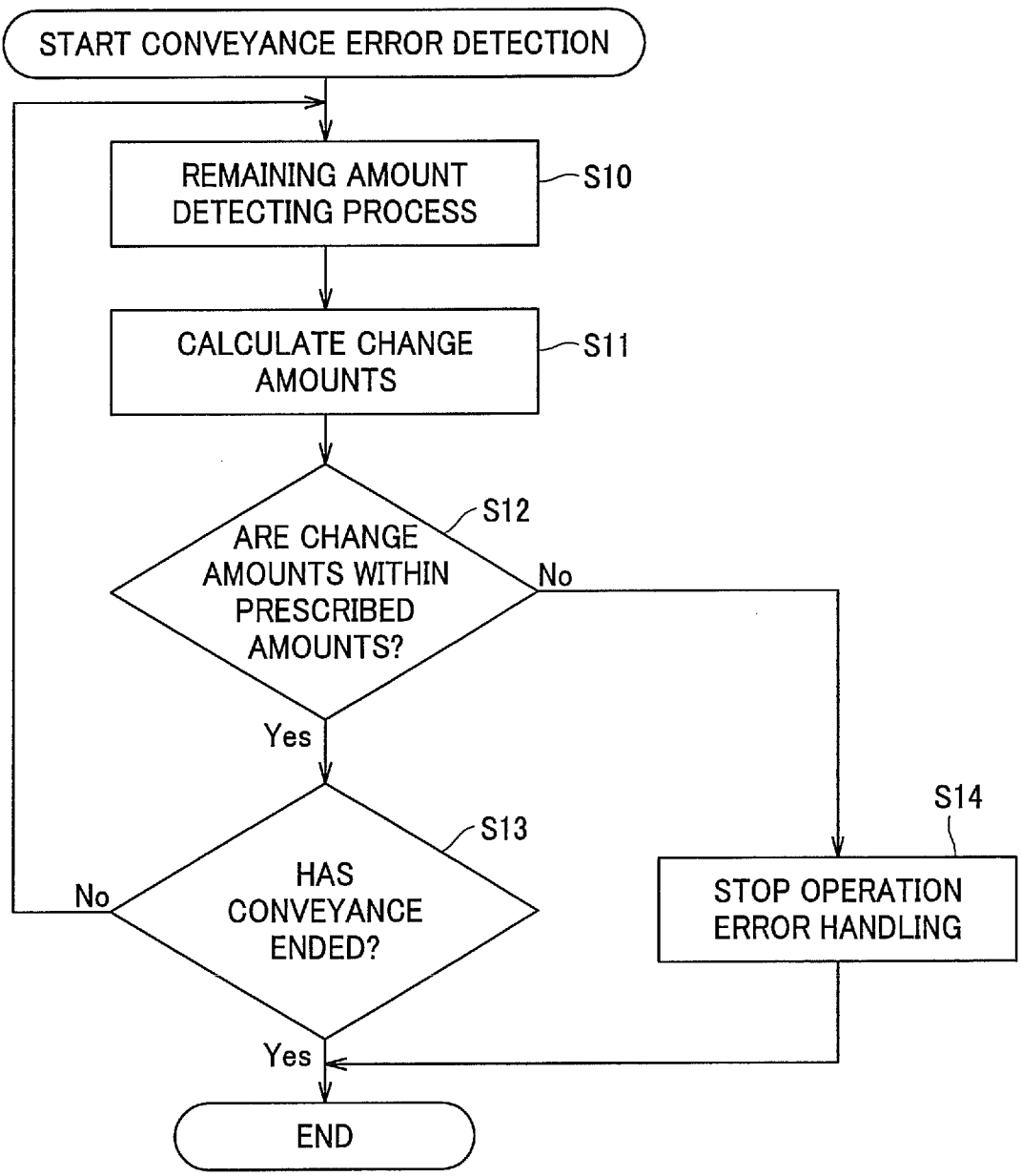
FIG. 8 is a flowchart when a process of detecting a conveyance error of the long medium to which the present invention is applied.

4. Description of the Operation of the Conveyance Error Detecting Process By the Printer Next, the operation of a conveyance error detecting process by the printer 2 is described with reference to a flowchart of FIG. 8. Here, as with the operation of the remaining amount detecting process, for example, the case of the long medium 1 having a predetermined length from the tip 1b already used is described.

At step S10, for example, when the long medium 1 is conveyed at the time of printing or the like, the control unit 27 performs operations similar to the operations of the remaining amount detecting process at step S1 to step S8 described above, thereby performing a remaining amount detecting process. While one first indicator hole 12 and one second indicator hole 13 are detected to detect the remaining amount of the long medium 1 closest to the midcourse tip 1e in the operations of the remaining amount detecting process described above, the control unit 27 causes a plurality of first indicator holes 12 and second indicator holes 13 to be detected to detect the remaining amounts at the plurality of points at step S10. For example, the control unit 27 causes the remaining amounts at three points.

At step S11, the control unit 27 calculates a first change amount between a first remaining amount and a second remaining amount and a second change amount between the second remaining amount and a third remaining amount.

At step S12, the control unit 27 determines whether the first change amount and the second change amount are within certain or prescribed amounts. Then, when the control unit 27 determines that the first change amount and the second change amount are not the certain or within prescribed amounts, the procedure goes to step S14, stopping the operation and causing the user to be notified via the display unit or the loudspeaker of a conveyance anomaly. Note that the control unit 27 may cause notification of a conveyance anomaly and also may cause the user to be notified that an authorized long medium 1 should be used. Also, when the control unit 27 determines that the first change amount and the second change amount are within the certain or prescribed amounts, the procedure goes to step S13, continuing the conveyance and ending the conveyance, for example, after the end of a printing process. As such, the printer 2 detects a conveyance error of the long medium 1.

Therefore, in the long medium 1 to which the present invention is applied, at the conveyance by the printer 2, a jam of the long medium 1 can be detected by detecting the change amount of the remaining amount of the long medium 1. Thus, in the long medium 1 to which the present invention is applied, a conveyance anomaly of the long medium 1 can be handled, such as stopping the printing operation.

5. Modification Examples

Note that the long medium 1 is not restricted to a roll paper sheet wound in a roll shape, and may be a fan-fold paper sheet alternately folded along perforation.

Furthermore, the long medium 1 is not restricted to the one having the adhesive sheet 3 provided so as to be narrower than the release sheet 5. For example, in the long medium 1, the adhesive sheet 3 may be provided so as to have approximately the same width as that of the release sheet 5, the adhesive sheet 3 may be provided on the entire surface of the release sheet 5, and the mark holes 11, the first indicator holes 12, and the second indicator holes 13 may be provided on a side edge part of the adhesive sheet 3.

Still further, the mark holes 11, the first indicator holes 12, and the second indicator holes 13 are not restricted to be provided so as to have the shapes, sizes, and spacing described above. The mark holes 11 each may have any shape, size, and spacing as long as the shape, size, and spacing allow the projections 20a of the sprocket 20 of the printer 2 to be engaged in the mark holes 11. Furthermore, the first indicator holes 12 and the second indicator holes 13 each may be formed in a circular shape or a rectangular shape other than a long hole shape, and may have the same shape and size as those of the mark holes 11. Still further, the first indicator holes 12 and the second indicator holes 13 may have different shape and sizes.

Still further, the first indicator holes 12 and the second indicator holes 13 are not restricted to be given on only one of the side edge parts 1a, and may be given on both. In this case, by giving the first indicator holes 12 and the second indicator holes 13 at the same position on both of the side edge parts 1a in the longitudinal direction, these holes can also be used as indicators for identifying the mark holes 11 at the same position in the longitudinal direction when the long medium 1 is set with the long medium 1 being coupled to the projections 20a of the sprockets 20. Thus, the mark holes 11 can be prevented from being diagonally set due to a step deviation.

Still further, the first indicator holes 12 and the second indicator holes 13 are not restricted to be given up to a position where the remaining amount of the long medium 1 is approximately 0 m, and may be given to a position where the remaining amount of the long medium 1 has a predetermined length, for example, 1 m, left. Still further, the first indicator holes 12 and the second indicator holes 13 are not restricted to be given from the tip 1b of the long medium 1, and may be given from a predetermined position, for example, a position at 10 m, from the tip 1b of the long medium 1 to the trailing end 1c side. Still further, the first indicator holes 12 and the second indicator holes 13 may be given from a predetermined position to a position where the remaining amount of the long medium 1 has a predetermined length left, from the tip 1b of the long medium 1 to the trailing end 1c side.

Figure 9:
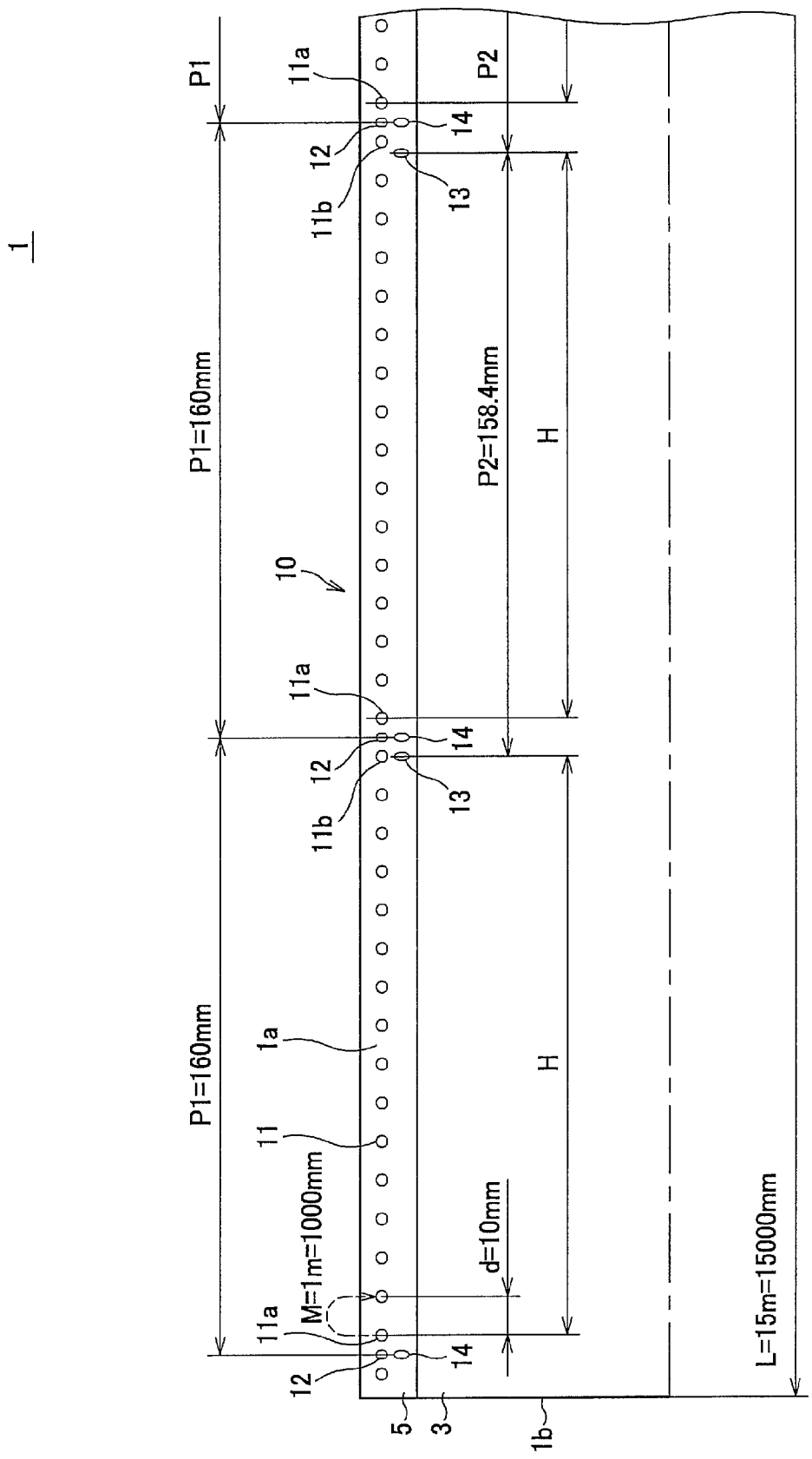
FIG. 9 is a plan view of a first modification example of the long medium to which the present invention is applied.

Still further, as depicted in FIG. 9, the long medium 1 may be provided with reference marks 14 each indicating a boundary of the mark indicators by the mark holes 11. These reference marks 14 are through holes provided on a same straight line L2 as the second indicator holes 13 so as to match the first indicator holes 12. In the long medium 1, with the reference marks 14 provided on the same straight line L2 as the second indicator holes 13 so as to match the first indicator holes 12, the boundary of the mark indicators can be easily grasped. Still further, when the spacing between the first indicator hole 12 and the second indicator hole 13 is read, the reference marks 14 serve as a substitute for the first indicator holes 12, and the spacing between the first indicator hole 12 and the second indicator hole 13 can be easily grasped.

Figure 10:
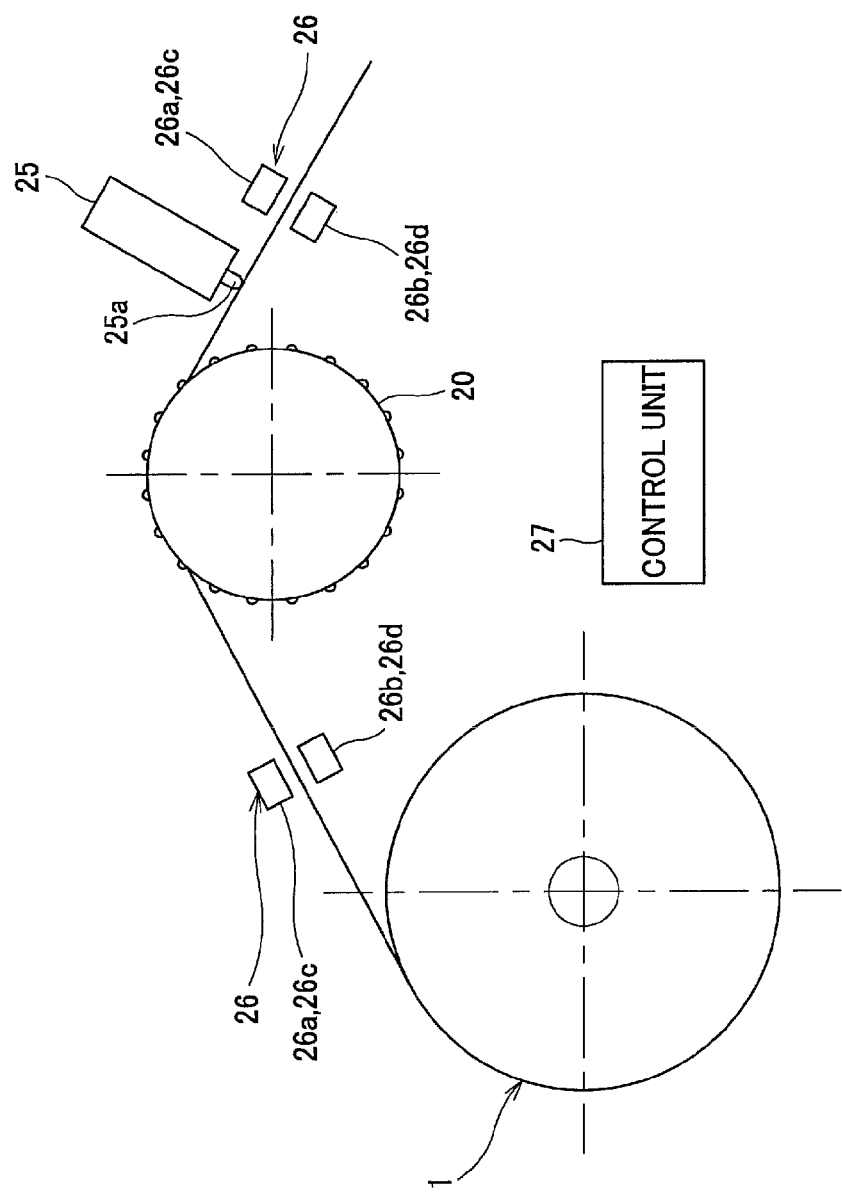
FIG. 10 is a block diagram of the structure of a cutting device in which the long medium to which the present invention is applied is used.

Still further, the long medium 1 is not restricted to be used in the printer 2. As depicted in FIG. 10, the long medium 1 to which the present invention is applied can be used in a cutting device 30 for cutting the long medium 1 printed on a printer not including the cutting mechanism 25. This cutting device 30 has a structure approximately similar to the structure with the thermal head 21 removed from the printer 2, and therefore details are omitted.

Still further, in the long medium 1, the unit length M may be set according to the length of the long medium 1. For example, the unit length M may be set long according to the length of the long medium 1 is increased. With this, the length in a certain section from the leading-end mark hole 11a to the trailing-end mark hole 11b can be kept without changing the spacing between the mark holes 11. For this reason, the mark indicators can be placed without excessively increasing the length of the certain section from the leading-end mark hole 11a to the trailing-end mark hole 11b, an amount of the long medium 1 to be drawn can be decreased when the remaining amount of the long medium 1 is visually checked, thereby making a visual check easier.

Figure 11:
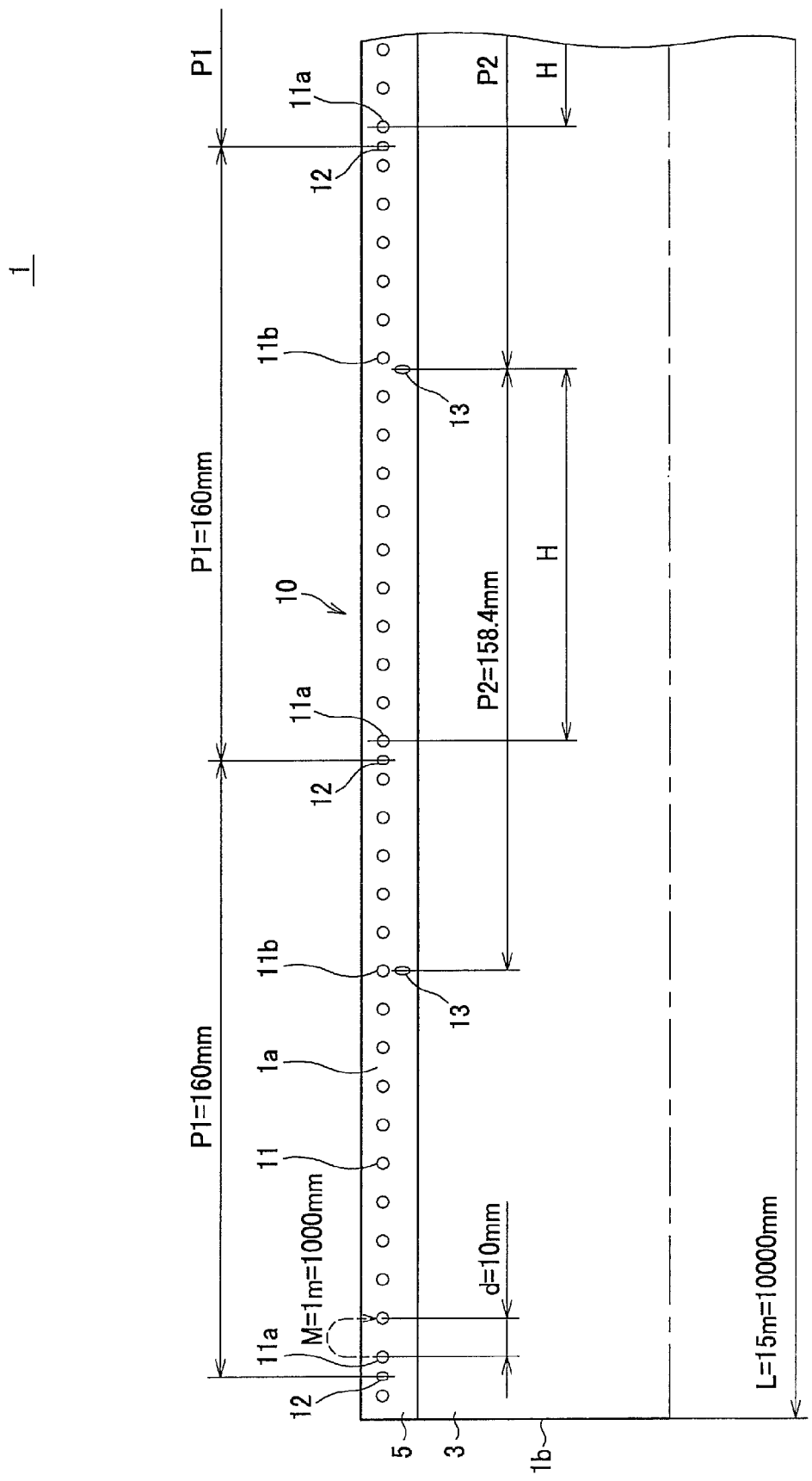
FIG. 11 is a plan view of a second modification example of the long medium to which the present invention is applied.

Still further, as depicted in FIG. 11, in the long medium 1, the mark hole 11 that comes first from the tip 1b side is set as the leading-end mark hole 11a from among the plurality of mark holes 11 interposed between the first indicator holes 12, 12 to be sectioned and the mark hole 11 that comes sixteenth is set as the trailing-end mark hole 11b. However, for example, the position of the trailing-end mark hole 11b may be set at a mark hole 11 that comes eleventh from the tip 1b side, according to the overall length of the long medium 1. In this case, the trailing-end mark hole 11b that matches a relevant second indicator hole 13 is a mark hole 11 that comes tenth from the leading-end mark hole 11a that pairs up to the trailing end 1c side, and it is therefore possible to visually grasp that the long medium 1 has the remaining amount of approximately 10 m.

Figure 12:
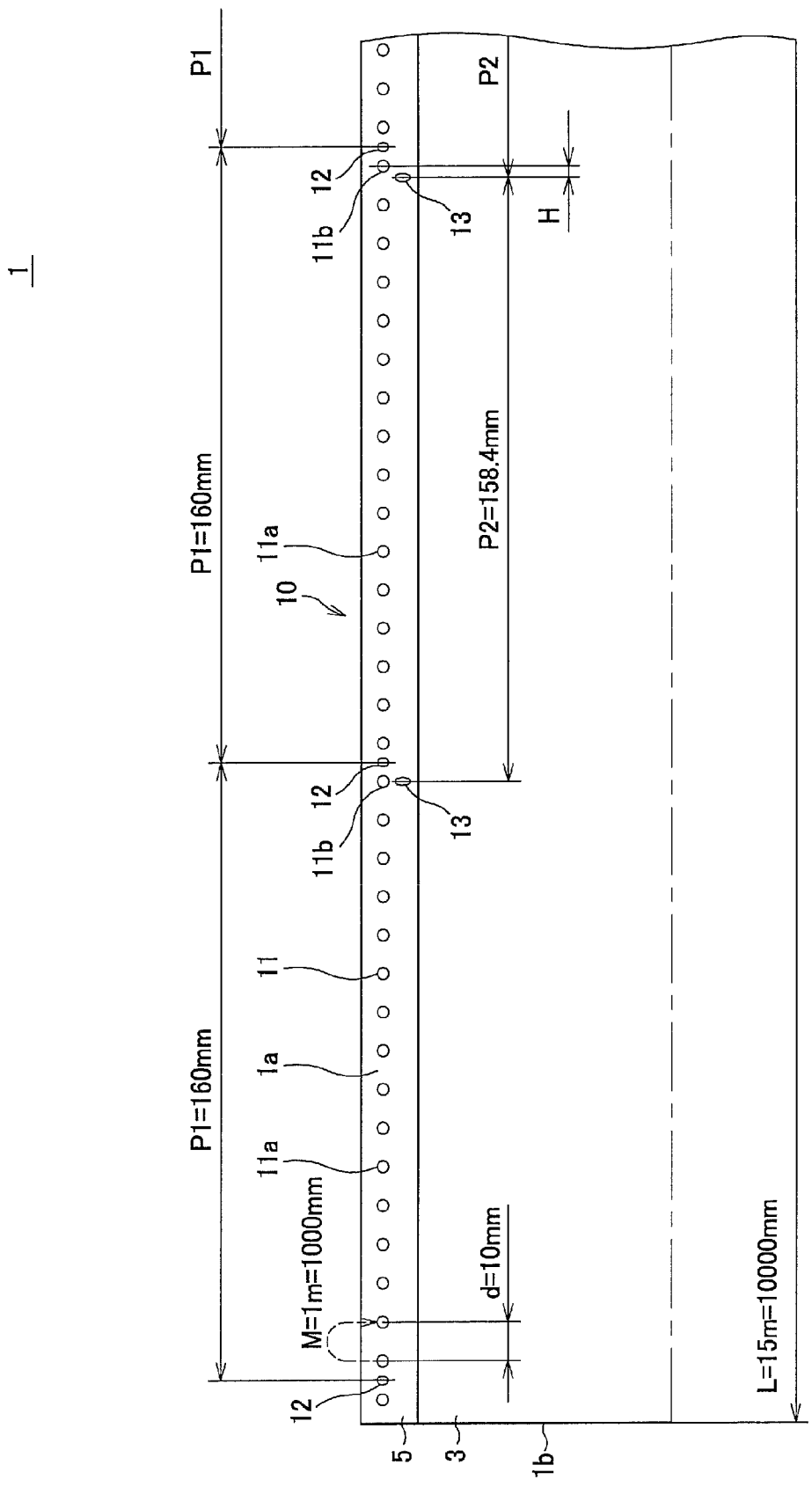
FIG. 12 is a plan view of a third modification example of the long medium to which the present invention is applied.

Still further, as depicted in FIG. 12, in the long medium 1, the positions of the leading-end mark hole 11a and the trailing-end mark hole 11b may be set in an offset manner. For example, a mark hole 11 that comes sixth from the first mark hole 12 on the tip 1b side of the long medium 1 from among the mark holes 11 may be set as the leading-end mark hole 11a. Here, the relevant second hole 13 is also offset according to the leading-end mark hole 11a and if it is placed so that the second indicator hole 13 approximately matches the leading-end mark hole 11a when the remaining amount of the long medium 1 runs out, it is possible to visually grasp that the remaining amount has run out. Here, by placing the trailing-end mark hole 11b in an offset manner near the first indicator 12 on the tip 1b side and comparing the distance of the distance from the first indicator hole 12 on the tip 1b side to the second indicator hole 13, it is possible to visually grasp by how long meters the long medium 1 has been used, instead of the remaining amount of the long medium 1.

Figure 13:
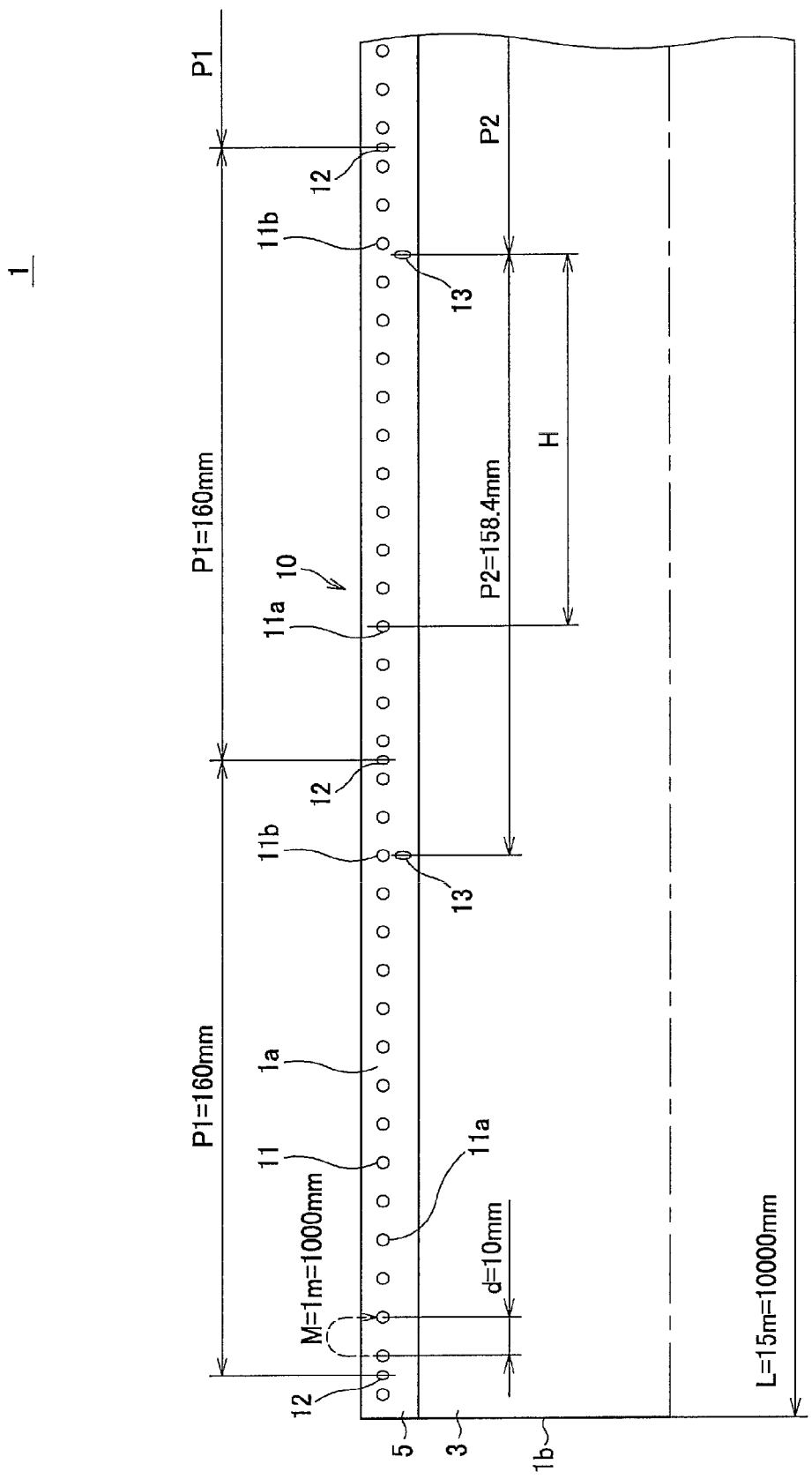
FIG. 13 is a plan view of a fourth modification example of the long medium to which the present invention is applied.

Still further, as depicted in FIG. 13, in the long medium 1, the leading-end mark hole 11a and the trailing-end mark hole 11b may be placed in an offset manner to the trailing end side 1b of the long medium 1. For example, the leading-end mark hole 11a is offset so as to match a mark hole 11 that comes fourth from the first indicator hole 12 on the tip side of the long medium 1, and the trailing-end hole 11b is offset so as to match a mark hole 11 that comes fourteenth. With this, since the first indicator holes 12 and the second indicator holes 13 are given at different steps in processing of the long medium 1, offsetting the positions of the leading-end mark hole 11a and the trailing-end mark hole 11b may be easier for processing. When these positions are offset, the user is notified that the leading-end mark hole 11a and the trailing-end mark hole 11b are placed in an offset manner from the first indicators 12 by using a known method such as describing as such on a package or an instruction manual. With this, the user can visually grasp the remaining amount of the long medium 1.

Figure 14:
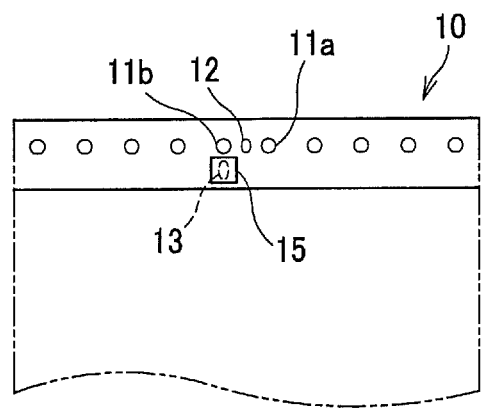
FIG. 14 is a plan view of a fifth modification example of the long medium to which the present invention is applied.

Still further, as depicted in FIG. 14, in the long medium 1, a film 15 may be affixed onto each first indicator 12 and each second indicator 13. Specifically, the film 15 is affixed so as to cover the through hole of the first indicator 12 and the through hole of the second indicator 13. With this, an area of the first indicator 12 and the second indicator 13 where the film 15 is affixed has a translucency higher than that of any other area of the long medium 1. Therefore, in the long medium 1, it is possible to detect the first indicator 12 and the second indicator 13 with the remaining amount detection sensor 26 more correctly than the case of the first indicator 12 and the second indicator 13 formed of simple through holes. Furthermore, with the film 15 having a color different from those of the surroundings, the first indicator 12 and the second indicator 13 can also be visually distinguished at ease.

Figure 15:
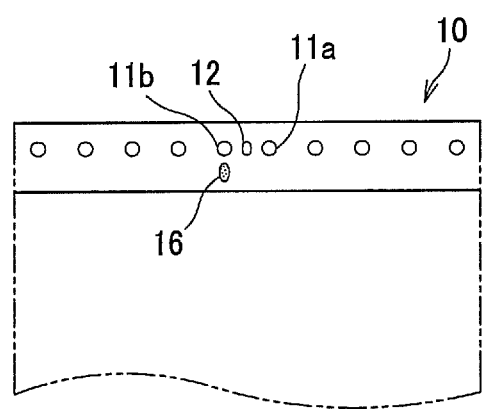
FIG. 15 is a plan view of a six the modification example of the long medium to which the present invention is applied.

Still further, as depicted in FIG. 15, in the long medium 1, the first indicator 12 and the second indicator 13 are not restricted to be through holes, and may be provided as a translucent part 16 thinner than any other area of the long medium 1 or formed of a mesh so as to have a translucency higher than that of any other area of the long medium 1. With this, in the long medium 1, the first indicator 12 and the second indicator 13 can be detected by the remaining amount detection sensor 26 more correctly than the case of the first indicator 12 and the second indicator 13 formed of simple through holes. Since the translucent part 16 that is thin or formed of a mesh is also visually and tactually different from the surroundings, the first indicator 12 and the second indicator 13 can be distinguished at ease.

6. First Reference Example

Next, a long medium 40 is described, which is a first reference example of the long medium 1 to which the present application is applied.

Figure 16:
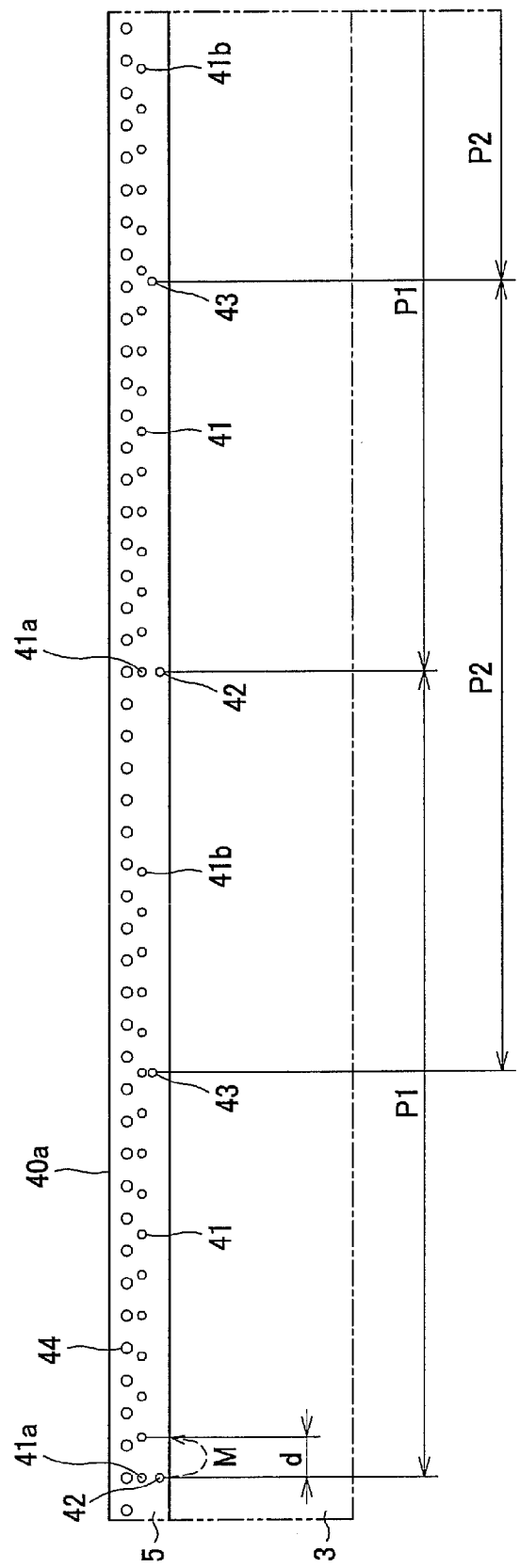
FIG. 16 is a plan view of a first reference example of the long medium to which the present invention is applied.

As depicted in FIG. 16, the long medium 40 of the first reference example has mark holes, which are through holes different from sprocket holes, while the mark holes 11 are sprocket holes in the long medium 1 described above. Mark holes 41 of the long medium 40 have the same structure as that of the mark holes 11 of the long medium 1 except that the mark holes 41 are equidistantly provided on a straight line along a longitudinal direction on one of side edge parts 40a of the long medium 40 in the longitudinal direction. Furthermore, first indicators 42 of the long medium 40 have the same structure as that of the first indicator holes 12 of the long medium 1 except that the first indicators 42 are given on a straight line inside a row of the mark holes 41 on one of the side edge parts 40a and the same side of the mark holes 41. Still further, second indicators 43 of the long medium 40 have the same structure as that of the second indicator holes 13 of the long medium 1. Still further, in the long medium 40, a plurality of sprocket holes 44 are equidistantly provided on a straight line outside the row of the mark holes 41 on both of the side edge parts 40a, 40a. These mark holes 41, first indicators 42, second indicators 43, and sprocket holes 44 are provided on a side edge part of a release sheet 5 not provided with an adhesive sheet 3 as a print layer.

In the long medium 40 of the first reference example described above, the mark holes 41 are required to be separately provided, and the print area is narrower than that of the long medium 1 described above. However, as with the long medium 1 described above, the remaining amount can be visually grasped at ease and in a correct manner by comparing the marks holes 41 and the distance from the leading-end mark hole 41a or the first indicator 42 to the second indicator 43.

Furthermore, in the long medium 40 of the first reference example, as with the long medium 1 described above, the first indicator holes 42 and the second indicator holes 43 are through holes. Thus, by only providing an optical sensor capable of detecting a through hole to the printer 2, the first indicator hole 42 and the second indicator hole 43 can be easily detected, and the remaining amount of the long medium 40 can also be mechanically detected at ease.

Note that the long medium 40 may be provided with the adhesive sheet 3 as a print layer on the entire surface of the release sheet 5. In this case, the mark holes 41, the first indicators 42, the second indicators 43, and the sprocket holes 44 are provided on the side edge part 40a of the long medium 40, that is, a side edge part of the adhesive sheet 3.

Furthermore, the long medium 40 may be conveyed in a longitudinal direction by being interposed by rollers. In this case, the long medium 40 is not required to be provided with the sprocket holes 44, and the mark holes 41 are required to be provided separately. However, as with the long medium 1 described above, the remaining amount can be visually and mechanically grasped at ease and in a correct manner without narrowing a print area.

7. Second Reference Example

Next, a long medium 50 is described, which is a second reference example of the long medium 1 to which the present invention is applied.

Figure 17:
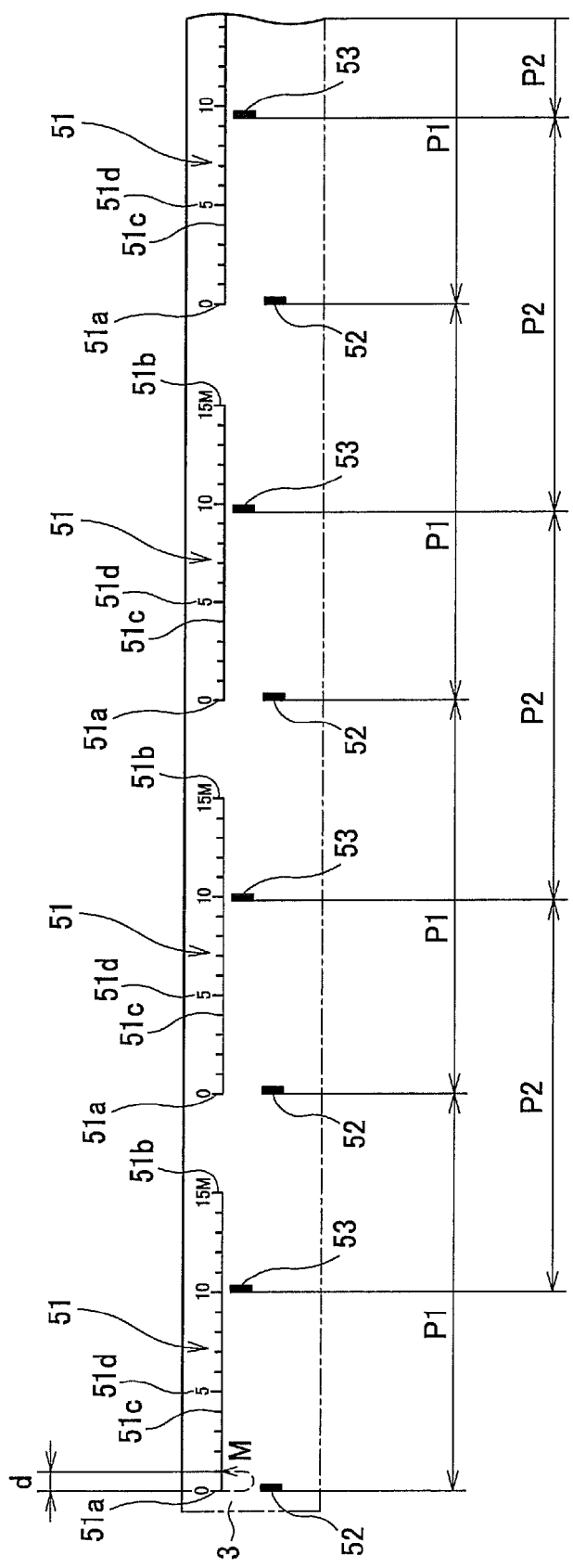
FIG. 17 is a plan view of a second reference example of the long medium to which the present invention is applied.

As depicted in FIG. 17, in the long medium 50 of the second reference example, in contrast to the first reference example described above in which the mark holes 41, the first indicators 42, and the second indicators 43 of the long medium 40 are through holes, these indicators are printed. Specifically, the long medium 50 is provided with an adhesive sheet 3 as a print layer on an entire surface of a release sheet 5, and marks 51 corresponding to the mark holes 41, first indicators 52 corresponding to the first indicators 42, and second indicators 53 corresponding to the second indicators 43 are printed on a side edge part of a front surface 3a of the adhesive sheet 3 or on a side edge part of a back surface 5b of the release sheet 5. The marks 51 each indicate, for example, a mark line 51c or a remaining amount numerical value 51d corresponding to the mark line 51c. The first indicators 52 and the second indicators 53 are, for example, rectangular-shaped, circular-shaped, or long-hole-shaped marks. Furthermore, the long medium 50 is conveyed in a longitudinal direction as being interposed between rollers of a printer 2 or a cutting device 30.

The long medium 50 of the second reference example as described above has a print area narrower than that of the long medium 1 described above when the first indicators 52 and the second indicators 53 are printed on the side edge part of the front surface 3a of the adhesive sheet 3. When they are printed on the back surface 5b of the release sheet 5, although printing is difficult, the remaining amount can be visually grasped at ease and in a correct manner by comparing the marks 51 and the distance from the start-end mark 51*a* or the first indicator 52 to the second indicator 53, as with the long medium 1 described above.

Furthermore, the long medium 50 of the second reference example as described above, since the first indicators 52 and the second indicators 53 are printed marks, as with the long medium 1 described above, by only providing an optical sensor capable of detecting a printed mark to the printer 2 in place of an optical sensor capable of detecting a through hole, the first indicator 52 and the second indicator 53 can be easily detected, and the remaining amount of the long medium 50 can also be mechanically detected at ease.

Note that sprocket holes may be provided outside a row of the marks 51 and, the long medium 50 may be conveyed by a sprocket 20 of the printer 2 or the cutting device 30 in the longitudinal direction. Furthermore, in the long medium 50, the adhesive sheet 3 as a print layer may be provided so as to be narrower than the release sheet 5 and the mark holes 51, the first indicators 52, and the second indicators 53 may be printed on the side edge part of the front surface 5*a* or the back surface 5*b* of the release sheet 5.

The invention claimed is:

1. A long medium having an adhesive sheet having a first adhesive side edge part and a second adhesive side edge part, the adhesive sheet temporarily adhered to a release sheet having a first release side edge part and a second release side edge part, comprising:
    a plurality of holes equidistantly provided on a straight line on both the first side edge part and the second side edge part in a longitudinal direction of the release sheet or all of the first adhesive side edge part and the second adhesive side edge part of the adhesive sheet and the first release side edge part and the second release side edge part of the release sheet;
    a plurality of first indicators repeatedly given on at least one of the first or second release side edge parts of the release sheet or all of the first adhesive side edge part and the second adhesive side edge part of the adhesive sheet and the first release side edge part and the second release side edge part of the release sheet on a straight line at spacings of an integral multiple of spacings of the plurality of holes; and
    a plurality of second indicators for equidistantly sectioning the plurality of holes, the plurality of second indicators are repeatedly given on at least one of the first or second release side edge parts of the release sheet or all of the first adhesive side edge part and the second adhesive side edge part of the adhesive sheet and the first release side edge part and the second release side edge part of the release sheet on a straight line different from a row of the first indicators at spacings shorter than spacings of the first indicators, wherein
    the plurality of holes, the plurality of first indicators, and the plurality of second indicators are provided approximately in parallel to one another,
    a spacing between a leading-end hole and a trailing-end hole between the pair of first indicators indicates a reference length of the long medium,
    the leading-end hole of the plurality of holes sectioned by the adjacent first indicators are placed on a tip side of the long medium and the trailing-end hole of the plurality of the holes sectioned by the adjacent first indicators are placed on a trailing-end side of the long medium,
    a first ratio of a spacing between the plurality of holes and a unit length of the long medium and a second ratio of a difference between a spacing between the first indicators and a spacing between the second indicators and a change amount of a length of the long medium indicated by this difference are approximately equal to each other,
    the second indicators are provided to a side of the trailing-end holes, and each gradually come closer to the leading-end hole that pairs up with the trailing-end hole as the long medium runs toward a trailing end,
    a spacing between the leading-end hole and the second indicator is approximately proportional to a remaining amount of the long medium, and
    the remaining amount of the long medium is visually grasped by comparing a distance from the first indicator to the second indicator with the number of the plurality of holes.

2. The long medium according to claim 1, wherein the spacing between the first indicators and the second indicators are set so as to have a relation in which the long medium runs out when the second indicator reaches a position of the leading-end hole.

3. The long medium according to claim 2, wherein the first indicators and the second indicators have a translucency higher than that of any other area of the long medium.

4. A long medium having an adhesive sheet having a first adhesive side edge part and a second adhesive side edge part, the adhesive sheet temporarily adhered to a release sheet having a first release side edge part and a second release side edge part, comprising:
    a plurality of holes equidistantly provided on a straight line on both the first side edge part and the second side edge part in a longitudinal direction of the release sheet or all of the first adhesive side edge part and the second adhesive side edge part of the adhesive sheet and the first release side edge part and the second release side edge part of the release sheet;
    a plurality of first indicators repeatedly given on at least one of the first or second release side edge parts of the release sheet or all of the first adhesive side edge part and the second adhesive side edge part of the adhesive sheet and the first release side edge part and the second release side edge part of the release sheet on a straight line at spacings of an integral multiple of spacings of the plurality of holes; and
    a plurality of second indicators for equidistantly sectioning the plurality of holes, the plurality of second indicators are repeatedly given on at least one of the side edge parts of the release sheet or all of the first adhesive side edge part and the second adhesive side edge part of the adhesive sheet and the first release side edge part and the second release side edge part of the release sheet on a straight line different from a row of the first indicators at spacings shorter than spacings of the first indicators, wherein
    the plurality of holes, the plurality of first indicators, and the plurality of second indicators are provided approximately in parallel to one another,
    a spacing between a leading-end hole and a trailing-end hole between the pair of first indicators indicates a reference length of the long medium,
    the leading-end hole of the plurality of holes sectioned by the adjacent first indicators are placed on a tip side of the long medium and the trailing-end hole of the plurality of the holes sectioned by the adjacent first indicators are placed on a trailing-end side of the long medium, a first ratio of a spacing between the plurality of the holes and a unit length of the long medium and a second ratio of a difference between a spacing between the first indicators and a spacing between the second indicators and a change amount of a length of the long medium indicated by this difference are approximately equal to each other, the second indicators are provided to a side of the trailing-end holes, and each gradually come closer to the leading-end hole that pairs up with the trailing-end hole as the long medium runs toward a trailing end, a spacing between the leading-end hole and the second indicator is approximately proportional to a remaining amount of the long medium, and a change in the remaining amount is visually grasped by comparing the number of holes between the first indicator and the second indicator with the mark part.

5. The long medium according to claim 4, wherein the plurality of holes are a plurality of sprocket holes in which projections of a sprocket are engaged.

* * * * *

(12) EX PARTE REEXAMINATION CERTIFICATE (10911th)
United States Patent
Ehara et al.

(10) Number: US 9,169,099 C1
(45) Certificate Issued: Jul. 22, 2016

(54) LONG MEDIUM

(75) Inventors: Takayuki Ehara, Tokyo (JP); Jun Okazaki, Tokyo (JP); Hiroaki Suto, Tokyo (JP); Hirohisa Usami, Tokyo (JP); Hiroyuki Fukumoto, Tokyo (JP)

(73) Assignee: MAX CO. LTD., Nihonbashi Hakozaki-Cho, Chuo-Ku, Tokyo (JP)

Reexamination Request:
No. 90/013,656, Dec. 10, 2015

Reexamination Certificate for:
Patent No.: 9,169,099
Issued: Oct. 27, 2015
Appl. No.: 13/700,105
PCT Filed: Mar. 25, 2011
PCT No.: PCT/JP2011/057483
§ 371 (c)(1),
(2), (4) Date: Apr. 2, 2013
PCT Pub. No.: WO2012/131858
PCT Pub. Date: Oct. 4, 2012

(30) Foreign Application Priority Data

Mar. 25, 2011 (JP) .................................. 2011-068994

(51) Int. Cl.
| | | |
|---|---|---|
| B65H 26/06 | (2006.01) |
| B41J 29/48 | (2006.01) |
| B42D 15/00 | (2006.01) |
| B65H 20/20 | (2006.01) |
| B42D 5/02 | (2006.01) |
| B41J 11/28 | (2006.01) |
| B65H 27/00 | (2006.01) |
| G06K 15/00 | (2006.01) |
| G06K 15/02 | (2006.01) |
| G06K 15/16 | (2006.01) |

(52) U.S. Cl.
CPC ................ *B65H 20/20* (2013.01); *B41J 29/48* (2013.01); *B42D 5/023* (2013.01); *B42D 15/0073* (2013.01); *B65H 26/063* (2013.01); *B65H 26/066* (2013.01); *B65H 27/00* (2013.01); *G06K 15/022* (2013.01); *G06K 15/16* (2013.01); *G06K 15/4065* (2013.01); *B65H 2220/03* (2013.01); *B65H 2301/5151* (2013.01); *B65H 2511/114* (2013.01); *B65H 2511/512* (2013.01); *B65H 2553/412* (2013.01); *B65H 2701/377* (2013.01); *Y10T 428/1476* (2015.01)

(58) Field of Classification Search
None
See application file for complete search history.

(56) References Cited

To view the complete listing of prior art documents cited during the proceeding for Reexamination Control Number 90/013,656, please refer to the USPTO's public Patent Application Information Retrieval (PAIR) system under the Display References tab.

*Primary Examiner* — Krisanne Jastrzab

(57) ABSTRACT

A plurality of marks (11) equidistantly provided on both side edge parts (1a) of a long medium (1), a plurality of first indicator holes (12) equidistantly given on at least one of the side edge parts (1a), and a plurality of second indicator holes (13) given on at least one of the side edge parts (1a) on a straight line different from a row of the first indicator holes (12) at spacings shorter than spacings of the first indicator holes (12) are provided, and the second indicator holes (13) are each provided to a side of a trailing-end mark (11b), and each gradually comes closer to a leading-end mark (11a) as the long medium (1) runs toward a trailing end.

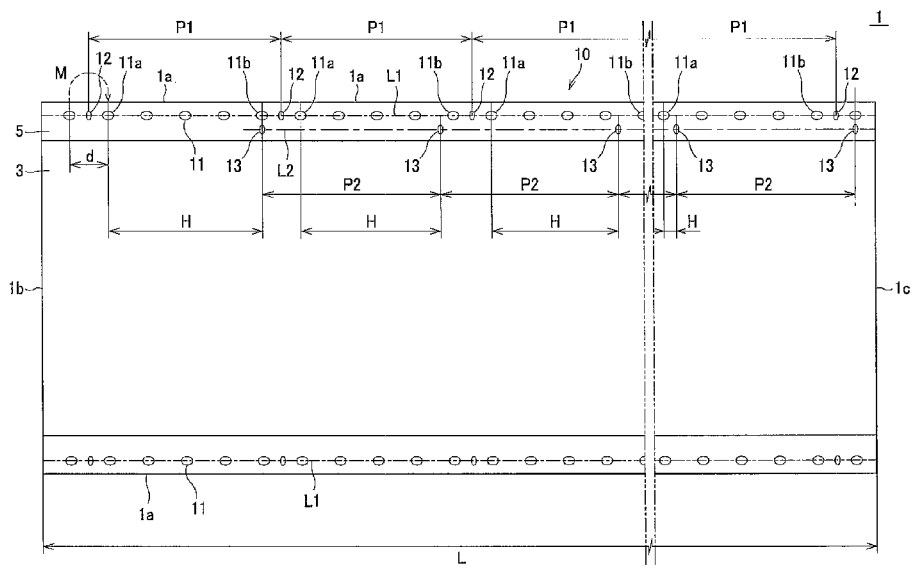

EX PARTE
REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1-5 is confirmed.

* * * * *